July 14, 1931.  C. T. PEACOCK  1,814,848
LISTER
Filed Sept. 16, 1930   2 Sheets-Sheet 2
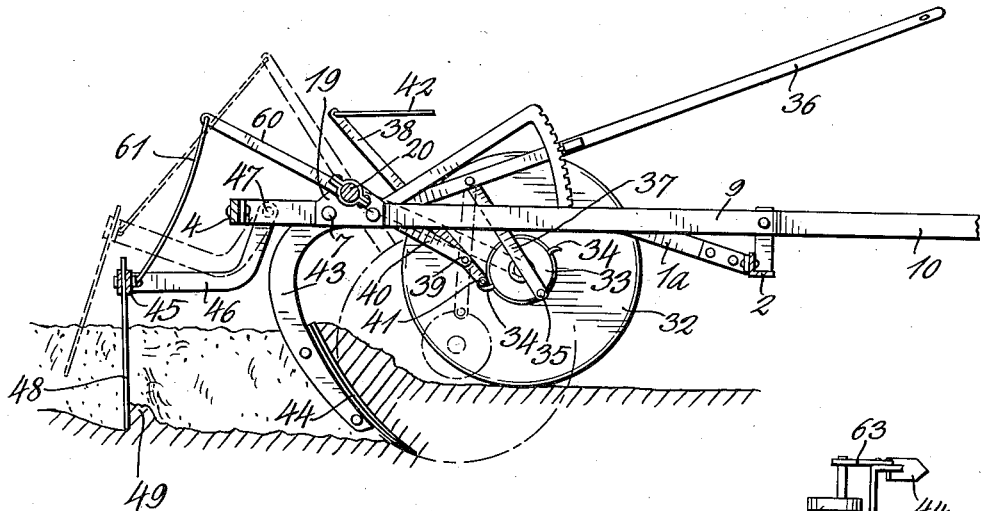

Patented July 14, 1931

1,814,848

UNITED STATES PATENT OFFICE

CHARLES T. PEACOCK, OF ARRIBA, COLORADO

LISTER

Application filed September 16, 1930. Serial No. 482,253.

This invention relates to improvements in agricultural implements and has reference more especially to an improved implement of the general type known as listers and which is particularly well adapted for the cultivation of dry farm lands during the fallow seasons.

In portions of our country where the rainfall is insufficient for raising crops every year, it is customary to raise crops every other year only and to let the land lie fallow between crop seasons. During the year that the land is fallow, it is worked by means of an implement resembling a lister which cuts deep furrows or trenches that are left open for the reception of rainwater, which is absorbed by the subsoil and stored for the next season's crop. The ground is worked several times by means of the implement referred to. The second time the ground is worked the ridges between the trenches are "busted" and the third time the ground is worked crosswise. If the third time is the last time it is worked, the ridges are usually busted to some extent so as to leave the ground in a condition in which it can be traversed by a tractor when the time comes for seeding.

It has been found that where land is worked in the manner just described, it is often badly washed or eroded when heavy rains fall as they generally do. This erosion becomes a matter of serious importance on land that is rolling as the trenches made by the implement are readily converted into ditches that carry away the water and the latter also carries away a large part of the soil.

It is an object of this invention to produce an improved type of farm implement of the type referred to which is so constructed that it will cut deep and narrow trenches that extend considerable distance into the subsoil and which is also provided with means for forming spaced transverse dams in the trenches for the purpose of preventing water from having an opportunity to flow unobstructed along the trench as is now the case.

Another object of this invention is to provide an implement of the type referred to which shall have an attachment that can be applied thereto during the last cultivation and which will serve to "bust" the ridges, thereby leaving the field in such condition that it can be traversed by a tractor.

The above and other objects that may become apparent as this description proceeds are attained by means of a construction and an arrangement of parts that will now be described in detail, and for this purpose reference will be had to the accompanying drawings in which the preferred embodiment of the invention has been illustrated, and in which:

Fig. 2 is a section taken on line 2—2, Fig. 1, and shows the parts in operative position;

Fig. 3 is a section taken on line 3—3, Fig. 1 and shows the cam means for raising and lowering the scraper blades;

Fig. 4 is a view looking in the direction of arrow 4 in Fig. 3, and shows the shape of the scraper blades;

Fig. 5 is a section taken through the bottom of a trench showing the dams in place;

Fig. 6 is a fragmentary view showing the attachment applied during the last cultivation for busting the ridges; and Fig. 7 is a section taken on line 7—7, Fig. 6.

Figure 1:
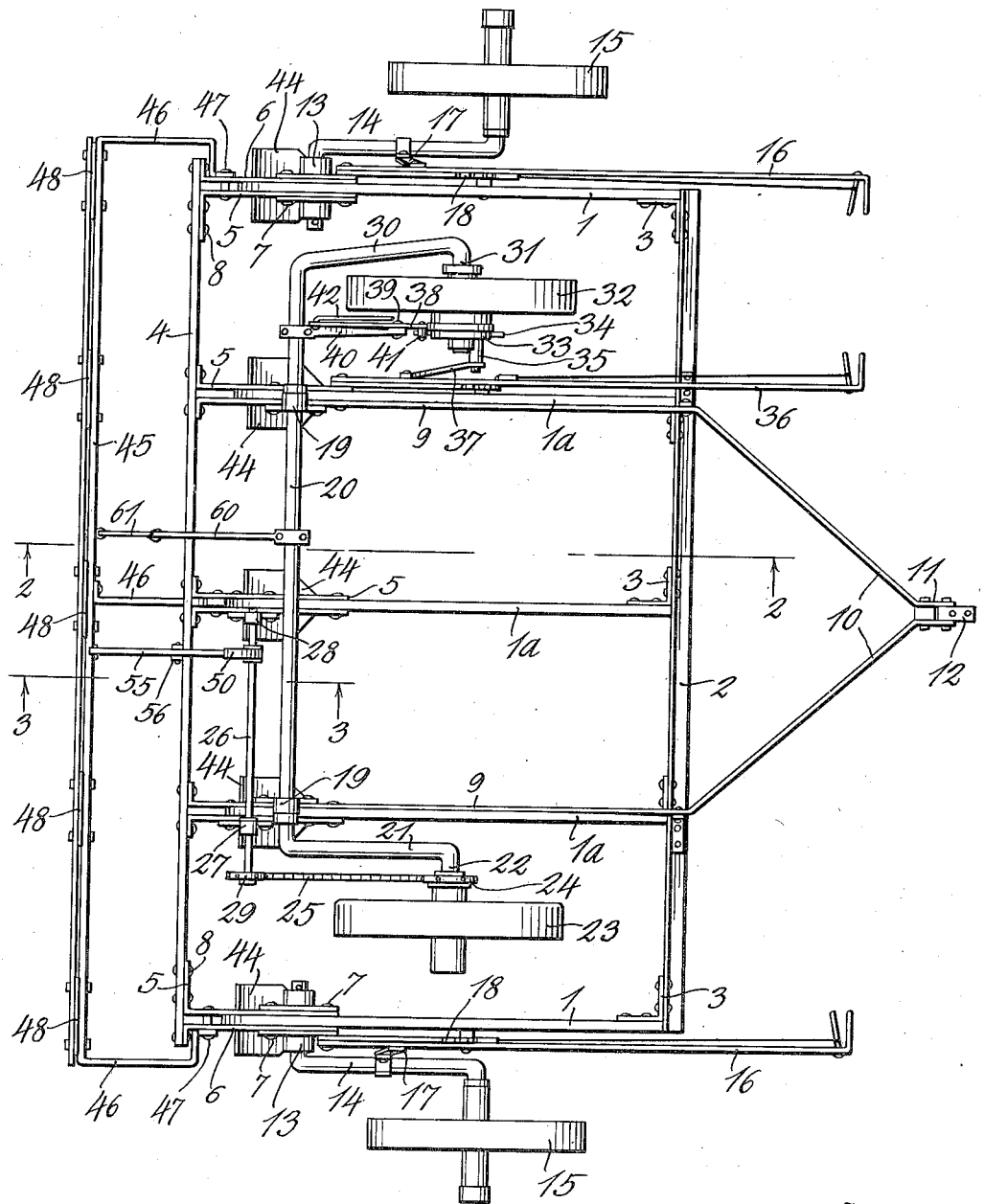
Fig. 1 is a top plan view of the improved implement.

The implement that forms the subject of this invention comprises a frame whose ends are formed in part by the beams 1 to the forward ends of which a transversely extending angleiron 2 is attached by means of brackets 3, or by other suitable means. A rear transverse member 4 is connected with the rear ends of beam 1 by means of bars 5 and 6. These bars are secured to the beams by means of bolts or rivets 7 and have their free ends bent at right angles and secured to the bar 4 by means of rivets 8. Located intermediate beams 1 are three similar beams that have been designated by reference character 1a. The front ends of all of the beams are secured to the bar 2 by means of angles 3, as shown. The rear ends of the beams 1a are connected with the transverse bar 4 by means of bars 5 and 6. The bars 9 that correspond to bars 5 used in connection with beams 1 extend forwardly to the front of the anglebar 2 where they are bent inwardly as indicated by reference numerals 10, the ends of parts 10 extend parallel to each other and are connected with a tractor hitch 12. Secured to the beams 1 are bearings 13 in which one end of each of the axles 14 is journalled. Supporting wheels 15 are rotatably mounted on the free ends of these Z-shaped axles in the manner shown in the drawings. The position of the axles can be adjusted by means of levers 16 that are connected with the axles by means of rods 17 and which are held in adjusted position by means of quadrants 18. The details of the construction in regard to these wheels and axles will not be fully described for the reason that they form no part of this invention and are well known constructions widely employed in connection with listers of the type to which this invention relates. Secured to the outer of the three beams, 1a, are bearings 19, in which the shaft 20 is mounted. The righthand end of shaft 20 has a part 21 bent at right angles to the main portion thereof and the outer end of this part is bent outwardly as indicated by reference numeral 22. Secured to the part 22 is a truck wheel 23. The inner end of the hub of this wheel carries a sprocket wheel 24 with which the sprocket chain 25 cooperates. Shaft 26 is mounted for rotation in bearings 27 and 28 and carries a sprocket wheel 29 with which the chain 25 cooperates. The purpose of this shaft will hereinafter appear. The lefthand end of shaft 20 has a part 30 that corresponds to part 21 at the other end but which is bent at an obtuse angle and terminates in an inwardly extending portion 31 on which the truck wheel 32 is journalled. Carried by the part 31 and connected with the wheel is a power lift mechanism of the usual construction and which comprises a drum 33 having diametrically located lugs 34. This drum is rotatably mounted on the axle portion 31 and has an outwardly extending projection 35 that is connected with lever 36 by means of a connecting rod 37. A pawl 38 is pivoted at 39 to the end of a bracket 40. The lower end of member 38 has a roller 41 which can be moved into the path of the lugs 34 in the manner shown in Fig. 2. The upper end of member 38 has attached to it a cable 42 that terminates at a point adjacent the operator's seat on the tractor and when the operator exerts a pull on this cable, the roller 41 will be moved away from the lugs 34, thereby permitting drum 33 to rotate through one hundred eighty degrees, whereby the part will move to the dotted line position shown in Fig. 2 and this will raise the frame and attached parts and hold them in inoperative position until the pull is again exerted on cable 42, whereupon the parts are moved from dotted line position, to full line position.

The rear ends of the beams have downwardly and forwardly curved portions 43 to which shovels 44 are attached. These shovels take the place of the ordinary lister plows and are usually about eighteen inches in length and about four to six inches in width, and are so adjusted that they will cut trenches that extend into the subsoil. In the implement illustrated, there are five beams and five shovels and therefore five trenches will be cut at the same time, as distinguished from the ordinary lister that cuts only three trenches at one time.

For the purpose of preventing the trenches from conducting water freely during heavy rains, I have provided an attachment that forms a series of spaced transverse dams in the bottoms of the trenches and these dams form pockets for the reception of the water and the latter will therefore soak into the ground instead of flowing along the trenches and causing erosion. The means by which the dams are formed consist of a bar 45 whose ends 46 are bent forwardly and then upwardly and are pivotally connected with the end members of the frame by means of bolts or rivets 47 which permit the bar to be oscillated about these bolts as pivots. Secured to the bar 45 are scraper blades 48, there being one scraper blade for each shovel and these blades are located directly behind the beams in such a position that when they are lowered to operative position as shown in Fig. 2, and therefore when the implement moves forwardly, these blades will scrape the loose dirt in front of them, thereby forming dams of the type designated by reference numeral 49 in Fig. 5. It is evident that some means must be provided for periodically raising the scraper blades and for lowering them again, as by this means only can spaced dams be formed. For the purpose of periodically raising and lowering the scraper blades, shaft 26 has been provided with a cam 50. This cam rotates in the direction of the arrow in Fig. 3 and has a cam surface 51 that recedes from the center of rotation at a fast rate until it reaches the point indicated by reference numeral 52 where it connects with the curved surface 53 that is part of a circle and this terminates at 54 in a surface that is practically radial with respect to the center of rotation. A lever 55 is pivoted intermediate its ends to a bracket 56. The front end of this lever has been indicated by reference numeral 57 and is bent upwardly and carries a roller 58 that lays in the plane of the cam and which is therefore engaged by the cam surfaces as the cam rotates. The rear end of lever 55 is connected by means of one or two chains 59 with the transverse bar 45. When the cam rotates the lever 55 will oscillate about its pivot from the full line position to the dotted line position shown in Fig. 3 and this will raise the scraper blades and when the parts again resume the position shown in Fig. 3, the scraper blades will become operative to form another dam, and in this way transverse dams will be formed at spaced intervals along the trenches while the implement is in operation. I consider the presence of the transverse dams of great importance as they prevent erosion in the manner above described, and the attachments whereby these dams are formed constitutes a valuable addition to implements of this type and as means for this purpose is new, I intend to claim this as my invention as broadly as the art permits.

Since shaft 26 rotates even when the shovels are held in inoperative position, it is evident that unless some special means is provided to prevent it, the dam forming mechanism will be periodically raised and lowered even when the implement is otherwise inoperative as when it is being transported from one place to the other. To prevent the dam forming mechanism from being raised and lowered when the machine is turned and when it is transported, I have provided shaft 20 with a rearwardly extending lever 60, which is clamped to the shaft in such a way that it will not rotate thereon. The rear end of lever 60 is connected with the transverse bar 45 by means of a chain or cable, and therefore when shaft 20 is rotated as it is when the parts are moved from full line to dotted line position shown in Fig. 2, lever 60 will be rotated to an angle corresponding to the angle to which shaft 20 rotates, and this will lift the dam forming mechanism from full line to dotted line position shown in Fig. 2 and will hold it in this position until the parts are again returned to the operative or full line position.

At the last cultivation it is desirable to bust the ridges so as to leave the surface of the field in a condition in which it may be traversed by the tractor during the seeding operation, and for which purpose I have provided a second attachment which consists of a bar 62 whose ends are secured to the rectangular frame of the implement by means of brackets 63. Rod 62 is held in such a way that it cannot rotate, and is provided with spring teeth 64, that are located half way between the shovels 44 and which will therefore bust the ridges as the implement is moved over the field.

Particular attention is called to the fact that instead of employing the ordinary lister plows, I employ long narrow shovels and place them much closer together than the plows. The ordinary plows employed cut shallow wide furrows whose bottoms are quite clean and which therefore facilitate erosion whereas by making the distance between the furrows less and cutting them deeper their bottoms will be covered to a considerable depth with loose ground which helps to absorb moisture and which greatly retards erosion. This is of great importance in the cultivation of land in semi-arid regions where the land must be left fallow alternate seasons. By the simple expedient of cutting the furrows deep and close together so that loose dirt will roll from the sides and accumulate to a considerable depth in the bottoms of the furrows, a much better conservation of the moisture is obtained and there will be less erosion. In order to still further prevent erosion and conserve more of the water that falls during heavy rains, transverse dams are provided as above explained. The method described reduces the erosion from 50 to 75 per cent over that which takes place when the ordinary methods are used and holds the moisture evenly thereby producing uniform crop growth.

From the above description it will be apparent that I have produced an improved agricultural implement of the general type known as listers and which is especially well adapted for use where land is cultivated during the fallow season, and which is provided with means for forming transverse dams in the trenches so as to prevent erosion due to heavy rains, and which is also provided with means that can be attached thereto during the last cultivation for the purpose of leaving the surface of the ground in such condition that it can be traversed by a tractor. Attention is also called to the fact that instead of the usual lister plows I have provided long, narrow shovels that are spaced closer together than the ordinary lister plows and which makes it possible to get deeper into the subsoil and at the same time to form narrower trenches, thereby obtaining a better absorption of the rainwater.

Having described the invention what is claimed as new is:

1. A lister comprising, in combination, a frame provided with a plurality of spaced lister shovels adapted to form spaced trenches, a bar extending in the direction of the width of the lister, the ends of the bar having bracket arms that are pivotally connected with the frame, a plurality of scraper plates attached to the bar and adapted to project into the trenches, and means for periodically raising and lowering the bar and the plates when the lister is moving whereby spaced dams are formed along the trenches.

2. A lister comprising, in combination, a frame whose outer ends are provided with supporting wheels, a plurality of beams secured to the frame in spaced relation, each beam having a shovel adapted to form a trench, a bar located to the rear of the frame and extending in the direction of the width of the lister, the ends of the bar having transverse bracket arms whose ends are pivoted to the frame, a plurality of scraper blades attached to the bar and extending downwardly, there being one blade for each trench, and means for periodically raising and lowering the bar when the lister is traveling whereby spaced transverse dams will be formed in the trenches.

3. A lister comprising, in combination, a frame whose outer ends are provided with supporting wheels, a plurality of beams secured to the frame in spaced relation, each beam having a shovel adapted to form a trench, a bar located to the rear of the frame, means for attaching the bar to the frame so that it will be vertically movable with respect to the frame, a plurality of scraper blades attached to the bar and extending downwardly, there being one blade for each trench and means for periodically raising and lowering the bar when the lister is traveling whereby spaced transverse dams will be formed in the trenches, said last named means comprising a shaft provided with a cam, means for rotating the shaft, a lever pivoted intermediate its ends one end being in contact with the cam and the other free, and means for connecting the free end of the lever with the bar whereby the latter will be raised and lowered when the lever is oscillated by the cam.

4. In a lister having a frame, a plurality of beams secured in spaced relation to the frame, shovels attached to the beams and adapted to form trenches, a bar located to the rear of the shovels and extending in the direction of the width of the lister, spaced downwardly extending plates secured to the bar and adapted to extend into the trenches for the purpose of forming spaced dams therein, means for pivotally connecting the ends of the bar to the frame, means for periodically raising and lowering the bar, and means for raising the frame, the shovels, and the bar and plates until the shovel and bar and plates are raised into inoperative positions.

In testimony whereof I affix my signature.

CHARLES T. PEACOCK.